United States Patent
Li et al.

(10) Patent No.: US 8,339,108 B2
(45) Date of Patent: Dec. 25, 2012

(54) CHARGING SYSTEMS THAT CONTROL POWER DISSIPATION IN A CHARGING PATH

(75) Inventors: Guoxing Li, Sunnyvale, CA (US); Xin Dong, Shenzhen (CN)

(73) Assignee: 02MICRO Inc, Santa Clara, CA (US)

( * ) Notice: Subject to any disclaimer, the term of this patent is extended or adjusted under 35 U.S.C. 154(b) by 523 days.

(21) Appl. No.: 12/568,981

(22) Filed: Sep. 29, 2009

(65) Prior Publication Data

US 2010/0244784 A1  Sep. 30, 2010

Related U.S. Application Data

(60) Provisional application No. 61/195,778, filed on Oct. 9, 2008.

(51) Int. Cl.
*H02J 7/06* (2006.01)

(52) U.S. Cl. ........................................ 320/163; 323/279

(58) Field of Classification Search .......... 320/162–164; 323/279
See application file for complete search history.

(56) References Cited

U.S. PATENT DOCUMENTS

| | | | |
|---|---|---|---|
| 5,576,609 A * | 11/1996 | Brown et al. | 320/164 |
| 5,703,470 A * | 12/1997 | Baranowski et al. | 320/152 |
| 5,869,950 A | 2/1999 | Hoffman, Jr. et al. | |
| 6,040,683 A * | 3/2000 | Mottier | 320/137 |
| 6,118,254 A * | 9/2000 | Faulk | 320/141 |
| 6,229,283 B1 * | 5/2001 | Kalogeropoulus et al. | 320/125 |
| 6,356,055 B1 | 3/2002 | Lin et al. | |
| 6,667,606 B2 * | 12/2003 | Oglesbee et al. | 323/284 |
| 6,861,824 B1 * | 3/2005 | Liu et al. | 320/164 |
| 6,873,134 B2 | 3/2005 | Canter et al. | |
| 7,193,392 B2 | 3/2007 | King et al. | |
| 7,345,895 B2 | 3/2008 | Zhu et al. | |
| 7,372,235 B2 | 5/2008 | Mori et al. | |
| 7,538,528 B2 * | 5/2009 | Heath | 323/274 |
| 7,548,437 B2 | 6/2009 | Choi et al. | |
| 8,018,200 B2 * | 9/2011 | Enjalbert et al. | 320/134 |
| 8,084,999 B2 * | 12/2011 | Esnard et al. | 320/136 |
| 2003/0042437 A1 | 3/2003 | Worley et al. | |
| 2007/0210756 A1 * | 9/2007 | Choi et al. | 320/128 |
| 2008/0094037 A1 * | 4/2008 | Enjalbert et al. | 320/162 |

FOREIGN PATENT DOCUMENTS

| | | |
|---|---|---|
| CN | 1819398 A | 8/2006 |
| WO | 2007145460 A1 | 12/2007 |
| WO | 2007145464 A1 | 12/2007 |

* cited by examiner

*Primary Examiner* — Edward Tso
*Assistant Examiner* — Manuel Hernandez (57) ABSTRACT

A circuit for charging a battery may include a switch operable for conducting a current flowing through the switch, and a first amplifier coupled to the switch and operable for adjusting the current according to an amount of power dissipation associated with the switch.

24 Claims, 6 Drawing Sheets

CHARGING SYSTEMS THAT CONTROL POWER DISSIPATION IN A CHARGING PATH

RELATED APPLICATION

This application claims priority to U.S. Provisional Application No. 61/195,778, "Battery Charging Systems," filed on Oct. 9, 2008, which is hereby incorporated by reference in its entirety.

BACKGROUND

Figure 1:
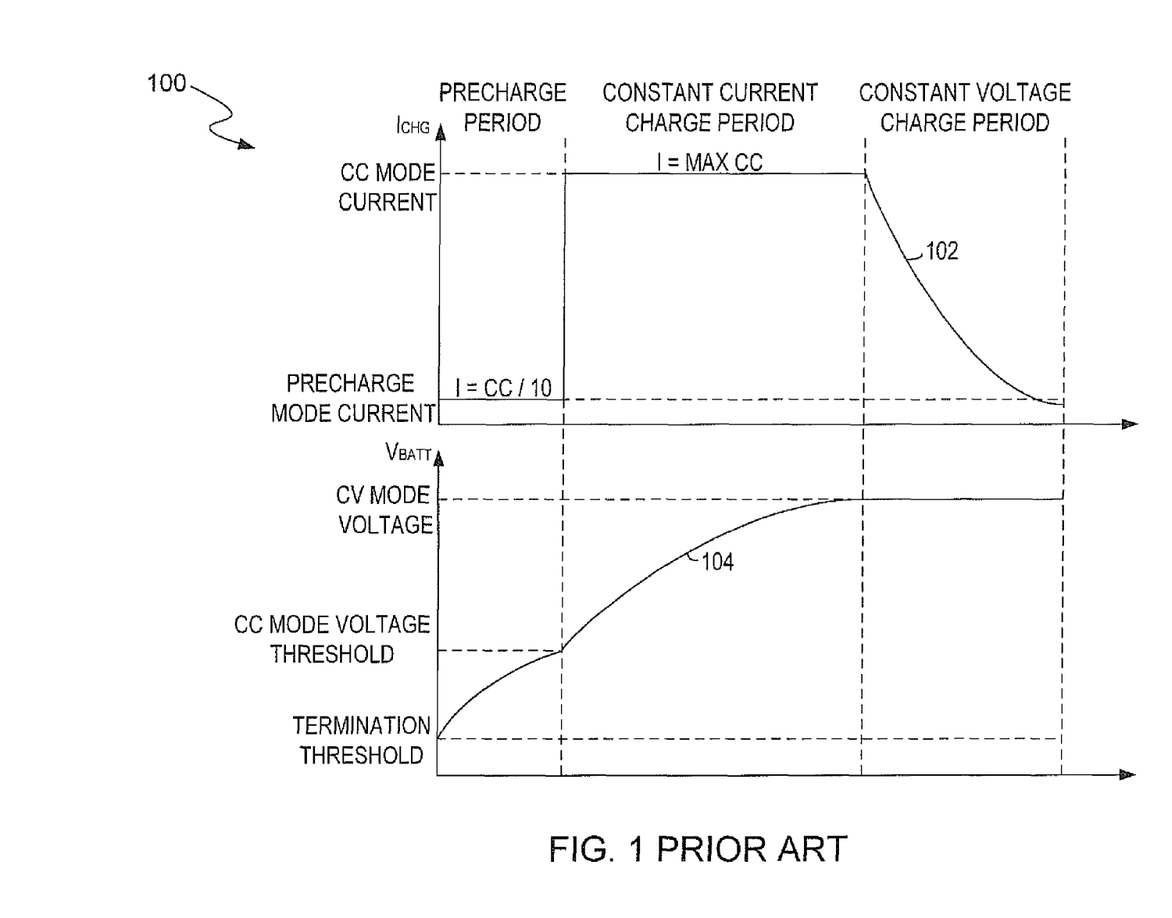
FIG. 1 illustrates a charging profile for a conventional battery charging system.

Generally, a conventional battery charging system, e.g., a Li-Ion battery charging system, has three charge periods including a precharge period, a constant current (CC) charge period, and a constant voltage (CV) charge period. Referring to FIG. 1, a charging profile 100 of a conventional battery charging system during the three periods is illustrated.

As shown in FIG. 1, the charging profile 100 includes a charging current profile 102 of a battery cell and a voltage profile 104 of the battery cell. The charging current profile 102 changes with the voltage profile 104 during the three charge periods described above. During the precharge period, the battery cell is charged with a small precharging current as shown in the charging current profile 102, and the battery cell voltage can increase slowly as shown in the voltage profile 104. When the battery cell voltage reaches a voltage threshold of a CC mode marked in the voltage profile 104, the battery charging system is transferred to the CC charge period. During the CC charge period, the battery cell is charged with a constant current as shown in the charging current profile 102, and accordingly the battery cell voltage can increase rapidly as shown in the voltage profile 104. When the battery cell voltage increases to a voltage threshold of a CV mode marked in the voltage profile 104, the battery charging system is transferred to the CV charge period. During the CV charge period, the battery cell will be charged with a current decreasing gradually as shown in the charging current profile 102 to keep the voltage of the battery cell constant and equal to the voltage threshold of the CV mode.

Power dissipation of a charging switch in a battery charging system can be expressed as $I_{CC}(V_{IN}-V_{BATT})$, where $I_{CC}$ represents the constant current and $(V_{IN}-V_{BATT})$ represents a voltage difference between a power source voltage, e.g., a voltage of an alternating current (AC) adaptor or a Universal Serial Bus (USB) port, and the battery cell voltage. In a battery charging system with a linear charger, a thermal issue may arise during the CC charge period since the value of $I_{CC}*(V_{IN}-V_{BATT})$ may be relatively high when the battery cell voltage is relatively low. This thermal issue may trigger the battery charging system's thermal protection mechanism, causing the battery charging system to stop charging until the temperature cools down enough. Under some circumstances, the battery charging system may stop charging after a relatively short period of time. This in turn may cause the battery charging system to quickly oscillate between charging and not charging, which may decrease the efficiency of the battery charging system.

SUMMARY

In one embodiment, a circuit for charging a battery includes a switch operable for conducting a current flowing through the switch, and a first amplifier coupled to the switch and operable for adjusting the current according to an amount of power dissipation associated with the switch.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to embodiments of the present invention. While the invention will be described in conjunction with these embodiments, it will be understood that they are not intended to limit the invention to these embodiments. On the contrary, the invention is intended to cover alternatives, modifications and equivalents, which can be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention can be practiced without these specific details. In other instances, well known methods, procedures, components, and circuits have not been described in detail as not to unnecessarily obscure aspects of the present invention.

Figure 2:
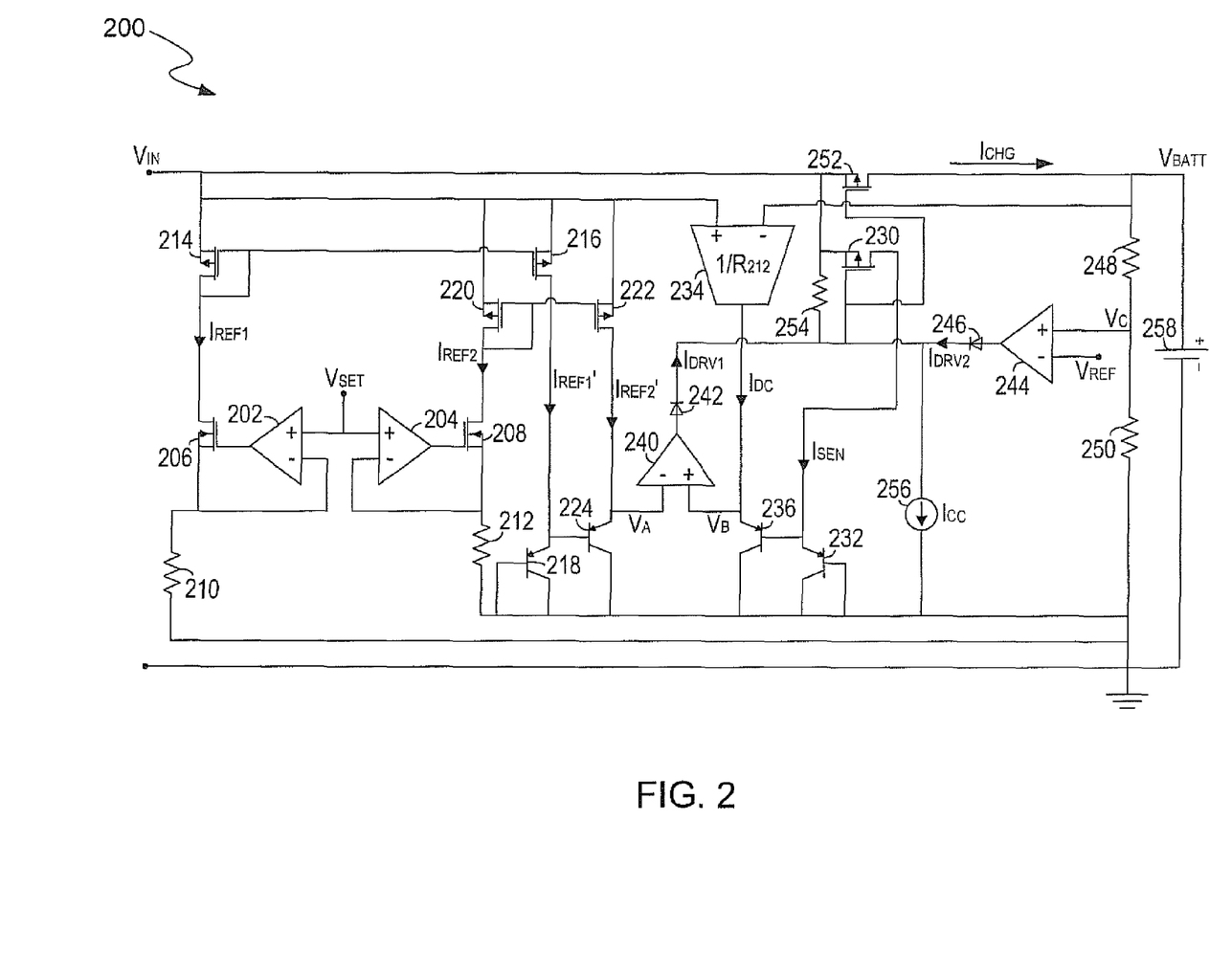
FIG. 2 is a block diagram of an example of a battery charging system in accordance with one embodiment of the present invention.

FIG. 2 illustrates a block diagram of an example of a battery charging system 200 with power dissipation control, in accordance with one embodiment of the present invention.

In this embodiment, a first reference voltage $V_{SET}$ is provided to a non-inverting input terminal of an amplifier 202, e.g., an operational amplifier (OPA). Moreover, an inverting input terminal and an output terminal of the OPA 202 are coupled to a source terminal and a gate terminal of a transistor 206, e.g., an N-Metal-Oxide-Semiconductor (NMOS) transistor, respectively. In addition, a resistor 210 is coupled between the source terminal of the NMOS transistor 206 and ground.

An inverting input voltage of the OPA 202 is equal to a non-inverting input voltage thereof, and therefore a source voltage of the NMOS transistor 206 can be equal to the reference voltage $V_{SET}$. By ignoring a gate current of the NMOS transistor 206 and an inverting input current of the OPA 202, a first reference current $I_{REF1}$ can be generated according to equation (1).

$$I_{REF1}=V_{SET}/R_{210} \tag{1}$$

$R_{210}$ represents a resistance of the resistor 210.

Furthermore, a second reference voltage $V_{SET}'$ is provided to a non-inverting input terminal of an amplifier 204, e.g., an operational amplifier (OPA). In one embodiment, the second reference voltage $V_{SET}'$ can be equal to the first reference voltage $V_{SET}$. Moreover, an inverting input terminal and an output terminal of the OPA 204 are respectively coupled to a source terminal and a gate terminal of a transistor 208, e.g., a NMOS transistor. In addition, a resistor 212 is coupled between the source terminal of the NMOS transistor 208 and ground.

Similarly, an inverting input voltage of the OPA 204 is equal to a non-inverting input voltage of the OPA 204, and therefore a source voltage of the NMOS transistor 208 can be equal to the reference voltage $V_{SET}$. By ignoring a gate current of the NMOS terminal 208 and an inverting input current of the OPA 204, a second reference current $I_{REF2}$ can be generated according to equation (2).

$$I_{REF2}=V_{SET}'/R_{212}=V_{SET}/R_{212} \qquad (2)$$

$R_{212}$ represents a resistance of the resistor 212.

In one embodiment, the battery charging system 200 further includes a first current mirror formed by transistors 214 and 216, e.g., P-Metal-Oxide-Semiconductor (PMOS) transistors. The PMOS transistors 214 and 216 are matched or identical in one embodiment. The first current mirror is coupled between the NMOS transistor 206 and a transistor 218, e.g., a PNP transistor. A base terminal and a collector terminal of the PNP transistor 218 are connected to ground. The battery charging system 200 also includes a second current mirror formed by transistors 220 and 222, e.g., PMOS transistors. The PMOS transistors 220 and 222 are matched or identical in one embodiment. The second current mirror is coupled between the NMOS transistor 208 and a transistor 224, e.g., a PNP transistor. The PNP transistor 224 is cascaded with the PNP transistor 218 since a base terminal of the PNP transistor 224 is connected to an emitter terminal of the PNP transistor 218. A collector terminal of the PNP transistor 224 is connected to ground.

By ignoring the base currents of the PNP transistor 218 and 224, a current $I_{REF1}'$ flowing through the PNP transistor 218 can be equal to the first reference current $I_{REF1}$. Thus, an emitter-base voltage $V_{EB1}$ of the PNP transistor 218 can be given according to equation (3).

$$V_{EB1}=V_T*\ln(I_{REF1}'/I_S)=V_T*\ln(I_{REF1}/I_S) \qquad (3)$$

$V_T$ represents a thermal voltage of each PNP transistor, e.g., the PNP transistors 218 and 224, at a given temperature. $I_S$ represents a reverse saturation current of a base-emitter diode in each PNP transistor, e.g., the PNP transistors 218 and 224.

Similarly, by ignoring the base current of the PNP transistor 224, a current $I_{REF2}'$ flowing through the PNP transistor 224 can be equal to the second reference current $I_{REF2}$. Thus, an emitter-base voltage $V_{EB2}$ of the PNP transistor 224 can be given according to equation (4).

$$V_{EB2}=V_T*\ln(I_{REF2}'/I_S)=V_T*\ln(I_{REF2}/I_S) \qquad (4)$$

Since the base terminal of the PNP transistor 218 is connected to ground and the base terminal of the PNP transistor 224 is connected to the emitter terminal of the PNP transistor 218, an emitter voltage $V_A$ of the PNP transistor 224 can be given according to equation (5).

$$\begin{aligned}V_A &= V_{EB1} + V_{EB2} \\ &= V_T*\ln(I_{REF1}/I_S) + V_T*\ln(I_{REF2}/I_S) \\ &= V_T*\ln((V_{SET}^2/R_{210})/(R_{212}*I_S^2))\end{aligned} \qquad (5)$$

In one embodiment, the battery charging system 200 further includes a charging current sensor 230, e.g., a PMOS transistor, coupled to a charging switch 252, e.g., a charging field effect transistor (FET). In one embodiment, the charging FET 252 can be a PMOS transistor. A gate terminal and a source terminal of the charging FET 252 are connected with a gate terminal and a source terminal of the PMOS transistor 230, respectively. Thus, the charging FET 252 and the PMOS transistor 230 have the same gate-source driving voltage. In one embodiment, the PMOS transistor 230 is K times smaller than the charging FET 252. Thus, a current $I_{SEN}$ can be K times smaller than a charging current $I_{CHG}$ if a short-channel modulation effect is ignored. The current $I_{SEN}$ can be given by equation (6).

$$I_{SEN}=I_{CHG}/K \qquad (6)$$

The battery charging system 200 further includes an amplifier 234, e.g., an operational transconductance amplifier (OTA), with a transconductance gain. In one embodiment, the transconductance gain of the OTA 234 can be set equal to $1/R_{212}$. An input voltage is provided to a non-inverting input terminal of the OTA 234 and a voltage of the battery cell 258 is provided to an inverting input terminal of the OTA 234. The voltage difference between the input voltage and the voltage of the battery cell 258 can be converted into a bias current $I_{DC}$ by the OTA 234. The bias current $I_{DC}$ can be given according to equation (7).

$$I_{DC}=(V_{IN}-V_{BATT})*Gm=(V_{IN}-V_{BATT})/R_{212} \qquad (7)$$

$V_{IN}$ represents the input voltage. $V_{BATT}$ represents the voltage of the battery cell 258 (in other words, a battery cell voltage).

In one embodiment, a transistor 232, e.g., a PNP transistor, is coupled to the PMOS transistor 230 for receiving the sensing current $I_{SEN}$. Base and collector terminals of the PNP transistor 232 are connected to ground. Furthermore, a transistor 236, e.g., a PNP transistor, is coupled to the OTA 234 for receiving the bias current $I_{DC}$. The PNP transistor 236 is cascaded with the PNP transistor 232 since the base terminal of the PNP transistor 236 is coupled to an emitter terminal of the PNP transistor 232 and the base terminal of the PNP transistor 232 is connected to ground.

By ignoring base currents of the PNP transistors 232 and 236, a current flowing through the PNP transistor 232 can be equal to the sensing current $I_{SEN}$. Thus, an emitter-base voltage $V_{EB3}$ of the PNP transistor 232 can be given according to equation (8).

$$V_{EB3}=V_T*\ln(I_{SEN}/I_S) \qquad (8)$$

$V_T$ represents a thermal voltage of each PNP transistor, e.g., the PNP transistors 218, 224, 232 and 236, at a given temperature. $I_S$ represents a reverse saturation current of a base-emitter diode in each PNP transistor, e.g., the PNP transistors 218, 224, 232 and 236.

Similarly, by ignoring the base current of the PNP transistor 236, a current flowing through the PNP transistor 236 can be equal to the bias current $I_{DC}$. Thus, an emitter-base voltage $V_{EB4}$ of the PNP transistor 236 can be given according to equation (9).

$$V_{EB4}=V_T*\ln(I_{DC}/I_S) \qquad (9)$$

Since the base terminal of the PNP transistor 232 is connected to ground and the base terminal of the PNP transistor 236 is connected to the emitter terminal of the PNP transistor 232, an emitter voltage $V_B$ of the PNP transistor 236 can be given according to equation (10).

$$V_B = V_{EB3} + V_{EB4} \quad (10)$$
$$= V_T * \ln(I_{DC}/I_S) + V_T * \ln(I_{SEN}/I_S)$$
$$= V_T * \ln(I_{SET} * I_{DC}/I_S^2)$$
$$= V_T * \ln((V_{IN} - V_{BATT}) * I_{CHG}/(K * R_{212} * I_S^2))$$
$$= V_T * \ln(P_{CHG}) - V_T * \ln(K * R_{212} * I_S^2)$$

$P_{CHG}$, which is equal to $(V_{IN}-V_{BATT})*I_{CHG}$, represents a power dissipation of the charging FET 252.

In one embodiment, the battery charging system 200 includes an error amplifier 240, e.g., an OPA, for keeping the power dissipation $P_{CHG}$ of the charging FET 252 at the predetermined power dissipation threshold $P_{SET}$. A non-inverting input terminal of the OPA 240 is connected to the emitter terminal of the PNP transistor 236, and an inverting input terminal of the OPA 240 is connected to the emitter terminal of the PNP transistor 224. A voltage difference $V_{DEF1}$ between the non-inverting input voltage $V_B$ and the inverting input voltage $V_A$ can be given according to equation (11).

$$V_{DEF1} = V_B - V_A \quad (11)$$
$$= V_T * \ln(P_{CHG}) - V_T * \ln(K * R_{212} * I_S^2) -$$
$$V_T * \ln((V_{SET}^2/R_{210})/(R_{212} * I_S^2))$$
$$= V_T * \ln(P_{CHG}) - V_T * \ln(K * R_{212} * I_S^2) -$$
$$V_T * \ln((K * V_{SET}^2/R_{210})/(K * R_{212} * I_S^2))$$
$$= V_T * \ln(P_{CHG}) - V_T * \ln(K * R_{212} * I_S^2) -$$
$$V_T * \ln(K * V_{SET}^2/R_{210}) + V_T * \ln(K * R_{212} * I_S^2)$$
$$= V_T * \ln(P_{CHG}) - V_T * \ln(P_{SET})$$

$P_{SET}$, which is equal to $K*V_{SET}^2/R_{210}$, represents a predetermined power dissipation threshold of the battery charging system 200. In one embodiment, the predetermined power dissipation threshold $P_{SET}$ can be programmed by adjusting the resistance of the resistor $R_{210}$. According to the voltage difference $V_{DEF1}$, the OPA 240 can generate a first driving current $I_{DRV1}$ to the charging FET 252 through a diode 242.

In one embodiment, the battery charging system 200 also includes an error amplifier 244, e.g., an OPA, for keeping the battery cell voltage $V_{BATT}$ at a predetermined voltage threshold. In addition, a resistor 248 and a resistor 250 coupled in series are connected between a positive terminal and a negative terminal of the battery cell 258. A non-inverting input terminal of the OPA 244 is coupled to a node between the resistor 248 and the resistor 250. Hence, the non-inverting input voltage $V_C$ of the OPA 244 can be given according to equation (12).

$$V_C = V_{BATT} * R_{250}/(R_{248} + R_{250}) \quad (12)$$

$R_{248}$ represents a resistance of the resistor 248. $R_{250}$ represents a resistance of the resistor 250. Additionally, a reference voltage $V_{REF}$ is provided to an inverting input terminal of the OPA 244. In one embodiment, the reference voltage $V_{REF}$ can be set by equation (13).

$$V_{REF} = V_{PRE} * R_{250}/(R_{248} + R_{250}) \quad (13)$$

$V_{PRE}$ represents the predetermined voltage threshold.

Accordingly, a voltage difference $V_{DEF2}$ between the non-inverting input voltage $V_C$ and the inverting input voltage $V_{REF}$ can be given according to equation (14).

$$V_{DEF2} = V_C - V_{REF} = (V_{BATT} - V_{PRE}) * R_{250}/(R_{248} + R_{250}) \quad (14)$$

According to the voltage difference $V_{DEF2}$, the OPA 244 can generate a second driving current $I_{DRV2}$ to the charging FET 252 through a diode 246.

In addition, a resistor 254 is coupled between the gate terminal and the source terminal of the charging FET 252. A source-gate voltage of the charging FET 252 can be approximately equal to a voltage across the register 254. A constant current source 256 is coupled with the resistor 254 in series for providing a constant current $I_{CC}$ to the resistor 254.

When a charger (not shown) is plugged into the battery charging system 200, the voltage difference $V_{DEF2}$ can be a negative value according to equation (14) if the voltage $V_{BATT}$ of the battery cell 258 is lower than the predetermined voltage threshold. As such, the second driving current $I_{DRV2}$ generated by the OPA 244 to the charging FET 252 can be very small. Thus, the second driving current $I_{DRV2}$ can be ignored. Additionally, the diode 246 can prevent a reverse current from flowing to an output terminal of the OPA 244. Accordingly, the driving current of the charging FET 252 is not affected by the OPA 244. The charging FET 252 can be controlled mainly by the first driving current $I_{DRV1}$ output from the OPA 240. Hence, the battery cell 258 can be charged with a constant power dissipation control on the charging FET 252.

During a constant power dissipation charge period, if the power dissipation $P_{CHG}$ of the charging FET 252 is greater than the predetermined power dissipation threshold $P_{SET}$, the voltage difference $V_{DEF1}$ can be a positive value according to equation (11). Accordingly, the first driving current $I_{DRV1}$ output from the OPA 240 can be increased. Since the current $I_{CC}$ is constant, a voltage drop $V_{254}$ over the resistor 254 can be decreased according to equation (15).

$$V_{254} = (I_{CC} - I_{DRV1}) * R_{254} \quad (15)$$

$R_{254}$ represents a resistance of the resistor 254. As such, the source-gate voltage of the charging FET 252 can be decreased, and thus the charging current $I_{CHG}$ and the power dissipation $P_{CHG}$ can be decreased.

If the power dissipation $P_{CHG}$ of the charging FET 252 is lower than the predetermined power dissipation threshold $P_{SET}$, the voltage difference $V_{DEF1}$ can be a negative value according to equation (11). Accordingly, the first driving current $I_{DRV1}$ output from the OPA 240 can be decreased. Since the current $I_{CC}$ is constant, the voltage drop $V_{254}$ over the resistor 254 can be increased according to equation (15). As such, the source-gate voltage of the charging FET 252 can be increased, and thus the charging current $I_{CHG}$ and the power dissipation $P_{CHG}$ can be increased.

Consequently, the power dissipation $P_{CHG}$ can be maintained at a nearly constant value. As such, a thermal issue will not occur in the battery charging system 200 during the constant power dissipation charge period.

When the battery cell voltage $V_{BATT}$ is near the predetermined voltage threshold, the voltage difference $V_{DEF2}$ can approach zero according to equation (14). Consequently, the second driving current $I_{DRV2}$ output from the OPA 244 can gradually increase and cannot be ignored. As such, the voltage drop $V_{254}$ over the resistor 254 can be given by equation (16).

$$V_{254} = (I_{CC} - I_{DRV1} - I_{DRV2}) * R_{254} \quad (16)$$

If the second driving current $I_{DRV2}$ is still increased, the voltage drop $V_{254}$ can be decreased. The charging current $I_{CHG}$ can also be decreased. The power dissipation $P_{CHG}$ can be decreased, which results in a decrease of the non-inverting input voltage $V_B$ of the OPA 240. As such, the first driving current $I_{DRV1}$ generated by the OPA 240 can be decreased. Since the second driving current $I_{REF2}$ increases while the first driving current $I_{DRV1}$ decreases, the voltage drop $V_{254}$ cannot be increased with respect to a decrease of the first driving current $I_{DRV1}$. As such, the first driving current $I_{DRV1}$ can be gradually decreased when the battery cell voltage $V_{BATT}$ approaches the predetermined voltage threshold.

When the battery cell voltage $V_{BATT}$ is equal to or greater than the predetermined voltage threshold, the first driving current $I_{DRV1}$ output from the OPA 240 can be very small. Thus, the first driving current $I_{DRV1}$ can be ignored. Additionally, the diode 242 can prevent a reverse current from flowing to the OPA 240. Then the charging FET 252 can be controlled mainly by the second driving current $I_{DRV2}$ outputted from the OPA 244. As such, the battery cell 258 can be charged under a constant voltage control. Accordingly, a smooth transition from the constant power dissipation control to the constant voltage control can be achieved.

During a constant voltage charge period, if the battery cell voltage VBATT increases above the predetermined voltage threshold, the voltage difference VDEF2 can be a positive value according to equation (14). As such, the second driving current IDRV2 generated by the OPA 244 can be increased. Since the current ICC is constant, the voltage drop V254 over the resistor 254 calculated by equation (17) can be decreased.

$$V_{254}=(I_{CC}-I_{DRV2})*R_{254} \quad (17)$$

As such, the source-gate voltage of the charging FET 252 can be decreased and thus the charging current $I_{CHG}$ can be decreased. While the charging current $I_{CHG}$ is decreased, the battery cell voltage $V_{BATT}$ can be increased more and more slowly. As such, the battery cell voltage $V_{BATT}$ can be kept nearly equal to the predetermined voltage threshold $V_{PRE}$.

In addition, when the first driving current $I_{DRV1}$ and the second driving current $I_{DRV2}$, generated by the OPA 240 and the OPA 244 respectively, are close to zero, the voltage drop $V_{254}$ over the resistor 254 is equal to $I_{CC}*R_{254}$. The input voltage of each charger is a constant value within a voltage range, e.g., from 4.5 v to 5.5 v, and the value of $I_{CC}*R_{254}$ can be set equal to the maximum value in the range, e.g., 5.5 v. Hence, the charging FET 252 can be regulated within a corresponding range.

Advantageously, when the battery cell voltage $V_{BATT}$ is lower than the predetermined voltage threshold, the battery charging system 200 can implement constant power dissipation control on the charging FET 252. When the battery cell voltage $V_{BATT}$ is equal to or greater than the predetermined voltage threshold, the battery charging system 200 can implement constant voltage control on the battery cell 258. As illustrated in FIG. 1, during the constant current charge period, a thermal issue may occur in a conventional battery charging system if a voltage difference between an input voltage of a power source, e.g., an AC adapter of a USB port, and a battery cell voltage is relatively large. Compared with a conventional battery charging system, a thermal issue will not occur in the battery charging system 200 during a whole charge period even if the voltage difference between the input voltage of the power source and the battery cell voltage $V_{BATT}$ is relatively large. Moreover, the battery charging system 200 can be used for charging an over-drained battery cell. When the battery cell voltage $V_{BATT}$ is relatively low, the charging current can be also relatively low to precharge the battery cell 258. In addition, when the battery cell voltage $V_{BATT}$ rises, the charging current can also increase until the power dissipation $P_{CHG}$ of the charging FET 252 reaches the predetermined power dissipation threshold $P_{SET}$. Thus, the overall charging speed can be relatively fast.

Figure 3:
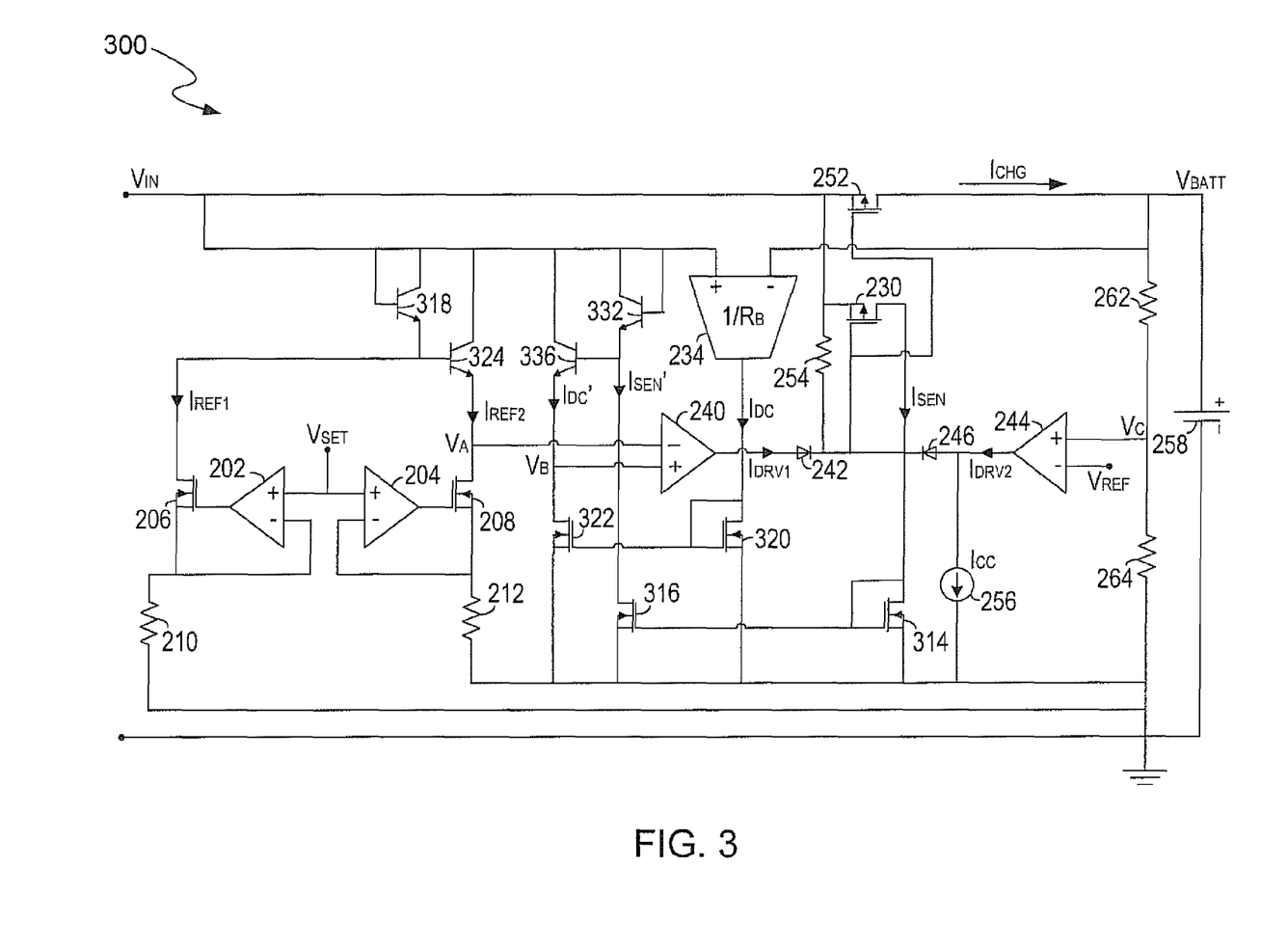
FIG. 3 is a block diagram of an example of a battery charging system in accordance with another embodiment of the present invention.

FIG. 3 illustrates a block diagram of an example of a battery charging system 300 with power dissipation control, in accordance with one embodiment of the present invention. Elements that are labeled the same as in FIG. 2 have similar functions and will not be repetitively described herein. FIG. 3 is described in combination with FIG. 2.

In FIG. 3, a transistor 318, e.g., an NPN transistor, is coupled with the NMOS transistor 206 for receiving the reference current $I_{REF1}$. Furthermore, a transistor 324, e.g., an NPN transistor, is coupled with the NMOS transistor 208 for receiving the reference current $I_{REF2}$. A base terminal and a collector terminal of the NPN transistor 318 are connected to the input voltage $V_{IN}$. A base terminal of the NPN transistor 324 is connected to an emitter terminal of the NPN transistor 318. Thus, the NPN transistor 324 is cascaded with the NPN transistor 318. A collector terminal of the NPN transistor 324 is connected to the input voltage $V_{IN}$.

The base currents of the NPN transistor 318 and 324 can be ignored, and therefore a current flowing through the NPN transistor 318 can be equal to the first reference current $I_{REF1}$. Thus a base-emitter voltage $V_{BE1}$ of the NPN transistor 318 can be given according to equation (18).

$$V_{BE1}=V_T*\ln(I_{REF1}/I_S) \quad (18)$$

$V_T$ represents a thermal voltage of each NPN transistor, e.g., the NPN transistors 318 and 324, for a given temperature in the battery charging system 300. $I_S$ represents a reverse saturation current of a base-emitter diode in each NPN transistor, e.g., the NPN transistors 318 and 324.

Similarly, the base current of the NPN transistor 324 can be ignored, and therefore a current flowing through the NPN transistor 324 can be equal to the second reference current $I_{REF2}$. Thus a base-emitter voltage $V_{BE2}$ of the NPN transistor 324 can be given according to equation (19).

$$V_{BE2}=V_T*\ln(I_{REF2}/I_S) \quad (19)$$

Since the base terminal of the NPN transistor 318 is connected to the input voltage $V_{IN}$ and the base terminal of the NPN transistor 324 is connected to the emitter terminal of the NPN transistor 318, an emitter voltage $V_A$ of the NPN transistor 324 can be given according to equation (20).

$$V_A=V_{IN}-(V_{BE1}+V_{BE2})=V_{IN}-(V_T*\ln(P_{SET})-V_T*\ln(K*R_{212}*I_S^2)) \quad (20)$$

$P_{SET}$, which is equal to $K*V_{SET}^2/R_{210}$, represents a predetermined power dissipation threshold of the battery charging system 300. In one embodiment, the predetermined power dissipation threshold $P_{SET}$ can be programmable by adjusting the resistance of the resistor $R_{210}$.

In one embodiment, the battery charging system 300 includes a first current mirror formed by transistors 314 and 316, e.g., NMOS transistors. The transistors 314 and 316 are matched or identical in one embodiment. The first current mirror is coupled between the PMOS transistor 230 and a transistor 332, e.g., an NPN transistor. A base terminal and a collector terminal of the NPN transistor 332 are connected to the input voltage $V_{IN}$. The battery charging system 300 further includes a second current mirror formed by transistors 320 and 322, e.g., NMOS transistors. The transistors 320 and 322 are matched or identical in one embodiment. The second current mirror is coupled between the output terminal of the OTA 234 and a transistor 336, e.g., an NPN transistor. The NPN transistor 336 is cascaded with the NPN transistor 332 since a base terminal of the NPN transistor 336 is connected to an emitter terminal of the NPN transistor 332. A collector terminal of the NPN transistor 336 is connected to the input voltage $V_{IN}$.

The base currents of the NPN transistor 332 and the NPN transistor 336 can be ignored, in which case a current $I_{SEN}'$ flowing through the NPN transistor 332 can be equal to the sensing current $I_{SEN}$ flowing through the NMOS transistor 314. Thus, a base-emitter voltage $V_{BE3}$ of the NPN transistor 332 can be given according to equation (21).

$$V_{BE3} = V_T * \ln(I_{SEN}'/I_S) = V_T * \ln(I_{SEN}/I_S) \quad (21)$$

$V_T$ represents a thermal voltage of each transistor, e.g., the NPN transistors 318, 324, 332 and 336, for a given temperature in the battery charging system 300. $I_S$ represents a reverse saturation current of a base-emitter diode in each transistor, e.g., the NPN transistors 318, 324, 332 and 336.

Similarly, the base current of the NPN transistor 336 can be ignored, in which case a current $I_{DC}'$ flowing through the NPN transistor 336 can be equal to the bias current $I_{DC}$ flowing through the NMOS transistor 320. Thus, a base-emitter voltage $V_{BE4}$ of the NPN transistor 336 can be given according to equation (22).

$$V_{BE4} = V_T * \ln(I_{DC}'/I_S) = V_T * \ln(I_{DC}/I_S) \quad (22)$$

Since the base terminal of the NPN transistor 332 is connected to the input voltage $V_{IN}$ and the base terminal of the NPN transistor 336 is connected to the emitter terminal of the NPN transistor 332, an emitter voltage $V_B$ of the NPN transistor 326 can be given according to equation (23).

$$V_B = V_{IN} - (V_{BE3} + V_{BE4}) = V_{IN} - (V_T * \ln(P_{CHG}) - V_T * \ln(K * R_{212} * I_S^2)) \quad (23)$$

$P_{CHG}$, which is equal to $(V_{IN} - V_{BATT}) * I_{CHG}$, represents a power dissipation of the charging FET 252.

In one embodiment, the non-inverting input terminal of the OPA 240 is coupled to an emitter terminal of the NPN transistor 336. The inverting input terminal of the OPA 240 is coupled to an emitter terminal of the NPN transistor 324. Accordingly, a voltage difference $V_{DEF1}$ between the non-inverting input voltage $V_B$ and the inverting input voltage $V_A$ can be given according to equation (24).

$$V_{DEF1} = V_B - V_A = V_T * \ln(P_{CHG}) - V_T * \ln(P_{SET}) \quad (24)$$

According to the voltage difference $V_{DEF1}$, the OPA 240 can generate a first driving current $I_{DRV1}$ to the charging FET 252 through the diode 242.

Accordingly, the battery charging system 300 can utilize the same processes as the battery charging system 200 in FIG. 2 to implement constant power dissipation control on the charging FET 252 and/or a constant voltage control on the battery cell 258.

Figure 4:
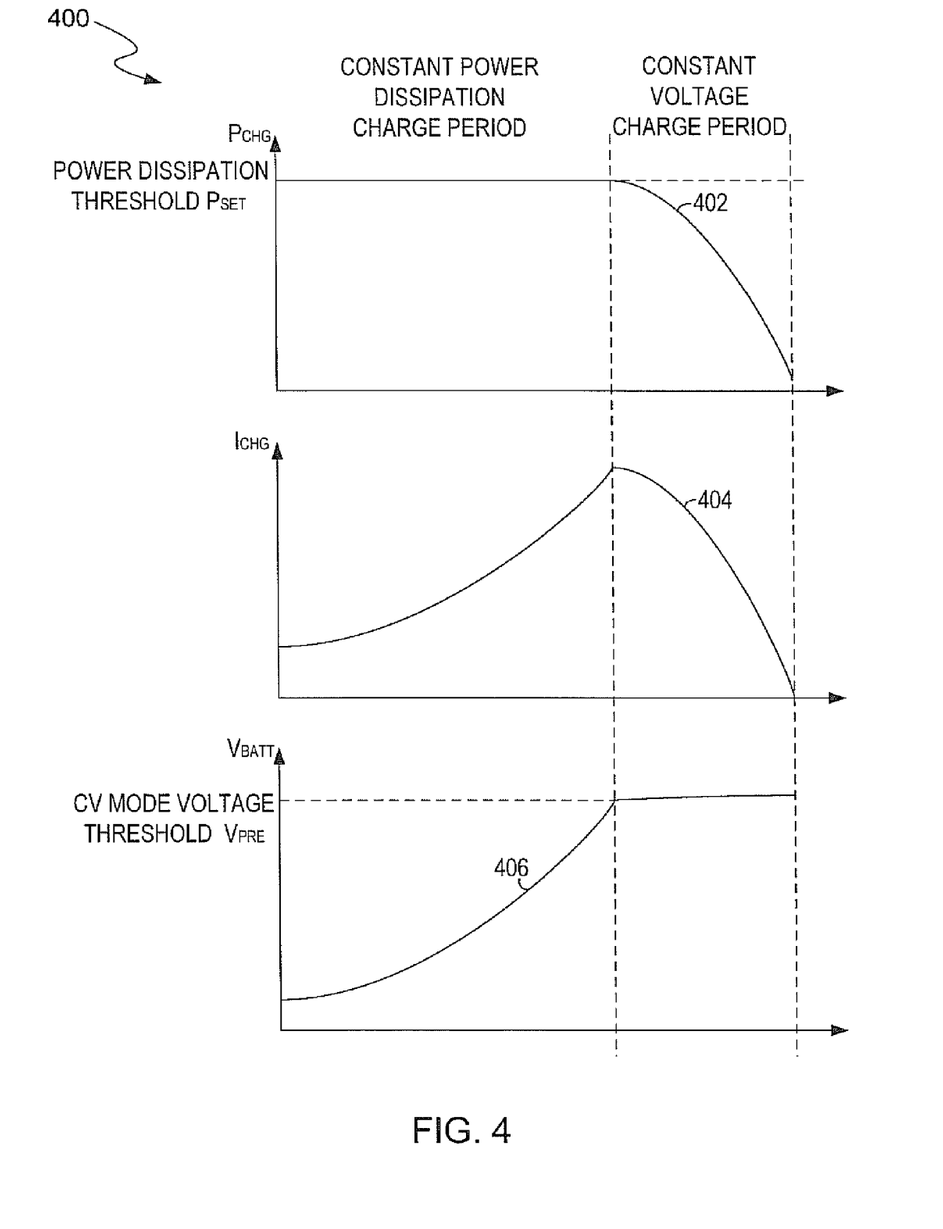
FIG. 4 illustrates a charging profile for a battery charging system in accordance with one embodiment of the present invention.

FIG. 4 illustrates a charging profile 400 of a battery charging system, e.g., the battery charging system 200 in FIG. 2, during the whole charging process, in accordance with one embodiment of the present invention. FIG. 4 is described in combination with FIG. 2. The charging profile 400 includes a power dissipation profile 402 of the charging FET 252, a charging current profile 404 of the battery cell 258, and a voltage profile 406 of the battery cell 258. The power dissipation profile 402 can vary with the charging current profile 404 and the voltage profile 406.

When a charger is plugged into the battery charging system 200, the voltage difference $V_{DEF2}$ can be a negative value according to equation (14) if the voltage $V_{BATT}$ of the battery cell 258 is lower than a predetermined voltage threshold $V_{PRE}$. Thus, a second driving current $I_{DRV2}$ outputted from the OPA 244 to the charging FET 252 can be small and the second driving current $I_{DRV2}$ can be ignored. Accordingly, the charging FET 252 can be controlled mainly by the first driving current $I_{DRV1}$ output by the OPA 240. Hence, the battery cell 258 can be charged with a constant power dissipation control on the charging FET 252.

During the constant power dissipation charge period, when the battery cell voltage $V_{BATT}$ is relatively low, the charging current $I_{CHG}$ is also small to keep the power dissipation $P_{CHG}$ of the charging FET 252 approximately equal to the predetermined power dissipation threshold $P_{SET}$. With the increase of the battery cell voltage $V_{BATT}$, the charging current can also increase to keep the power dissipation $P_{CHG}$ approximately equal to the predetermined power dissipation threshold $P_{SET}$.

When the battery cell voltage $V_{BATT}$ is near the predetermined voltage threshold $V_{PRE}$ marked in FIG. 4, the voltage difference $V_{DEF2}$ can approach zero according to equation (14). As a result, the second driving current $I_{DRV2}$ is gradually increased and cannot be ignored any more. Concurrently, the first driving current $I_{DRV1}$ generated by the OPA 240 can be gradually decreased. When the voltage $V_{BATT}$ of the battery cell 258 reaches the predetermined voltage threshold $V_{PRE}$, the first driving current $I_{DRV1}$ can be decreased until it is relatively small and can be ignored. Hence, the charging FET 252 can be controlled mainly by the second driving current $I_{DRV2}$ output from the OPA 244 and the battery cell 258 can be charged under a constant voltage control.

During the constant voltage charge period, the charging current $I_{CHG}$ gradually decreases to zero. Thus, the battery cell voltage $V_{BATT}$ can be increased more and more slowly. As such, the battery cell voltage $V_{BATT}$ can be kept approximately equal to the predetermined voltage threshold $V_{PRE}$. Concurrently, the power dissipation $P_{CHG}$ also decreases with the charging current $I_{CHG}$ since the battery cell voltage $V_{BATT}$ is nearly constant.

Figure 5:
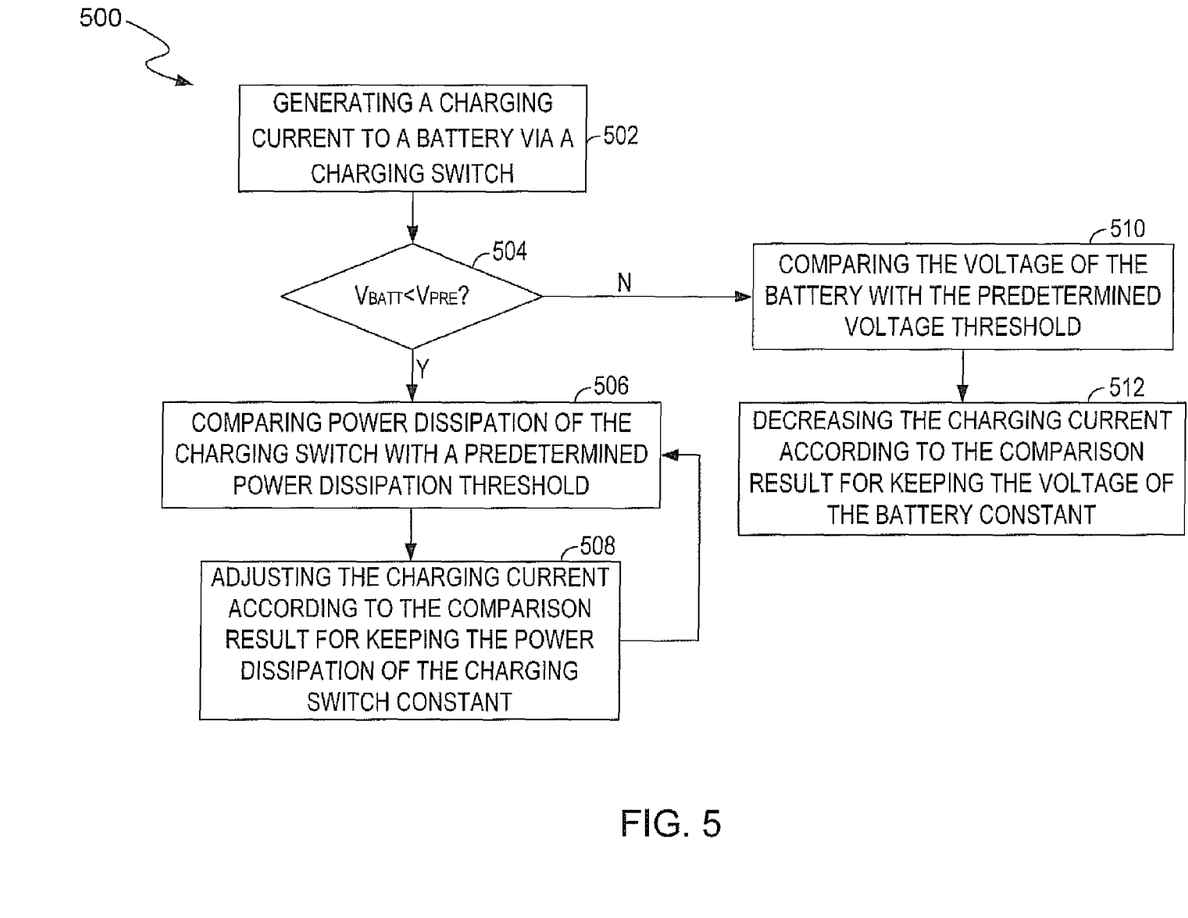
FIG. 5 illustrates a flowchart of operations performed by a battery charging system, in accordance with one embodiment of the present invention.

FIG. 5 illustrates a flowchart 500 of operations performed by a battery charging system, e.g., the battery charging system 200 in FIG. 2, in accordance with one embodiment of the present invention. FIG. 5 is described in combination with FIG. 2.

In block 502, the battery charging system starts to generate a charging current to a battery, e.g., the battery cell 258, via the charging switch 252. If a voltage $V_{BATT}$ of the battery is less than a predetermined voltage threshold $V_{PRE}$ (block 504), the power dissipation $P_{CHG}$ of the charging switch 252 can be compared with a predetermined power dissipation threshold $P_{SET}$, in block 506. In block 508, a charging current $I_{CHG}$ flowing through the charging switch 252 can be adjusted according to the comparison result to keep the power dissipation $P_{CHG}$ of the charging switch 252 constant.

In one embodiment, a driving current can be generated to the charging switch 252 according to the comparison result. If the power dissipation $P_{CHG}$ of the charging switch 252 is greater than the predetermined power dissipation threshold $P_{SET}$, the charging current $I_{CHG}$ can be decreased by the driving current. If the power dissipation $P_{CHG}$ of the charging switch 252 is smaller than the predetermined power dissipation threshold, the charging current $I_{CHG}$ can be increased by the driving current.

In block 510, the voltage $V_{BATT}$ of the battery can be compared with the predetermined voltage threshold $V_{PRE}$, if the voltage $V_{BATT}$ of the battery is equal to or greater than the predetermined voltage threshold $V_{PRE}$ (block 504). In block 512, the charging current $I_{CHG}$ flowing through the charging switch 252 can be adjusted according to the comparison result to control the voltage $V_{BATT}$ of the battery (e.g., keep it constant or nearly so).

In one embodiment, a driving current can be generated to the charging switch 252 according to the comparison result. If the voltage $V_{BATT}$ of the battery is greater than the predetermined voltage threshold $V_{PRE}$, the charging current $I_{CHG}$ can be decreased by the driving current.

Figure 6:
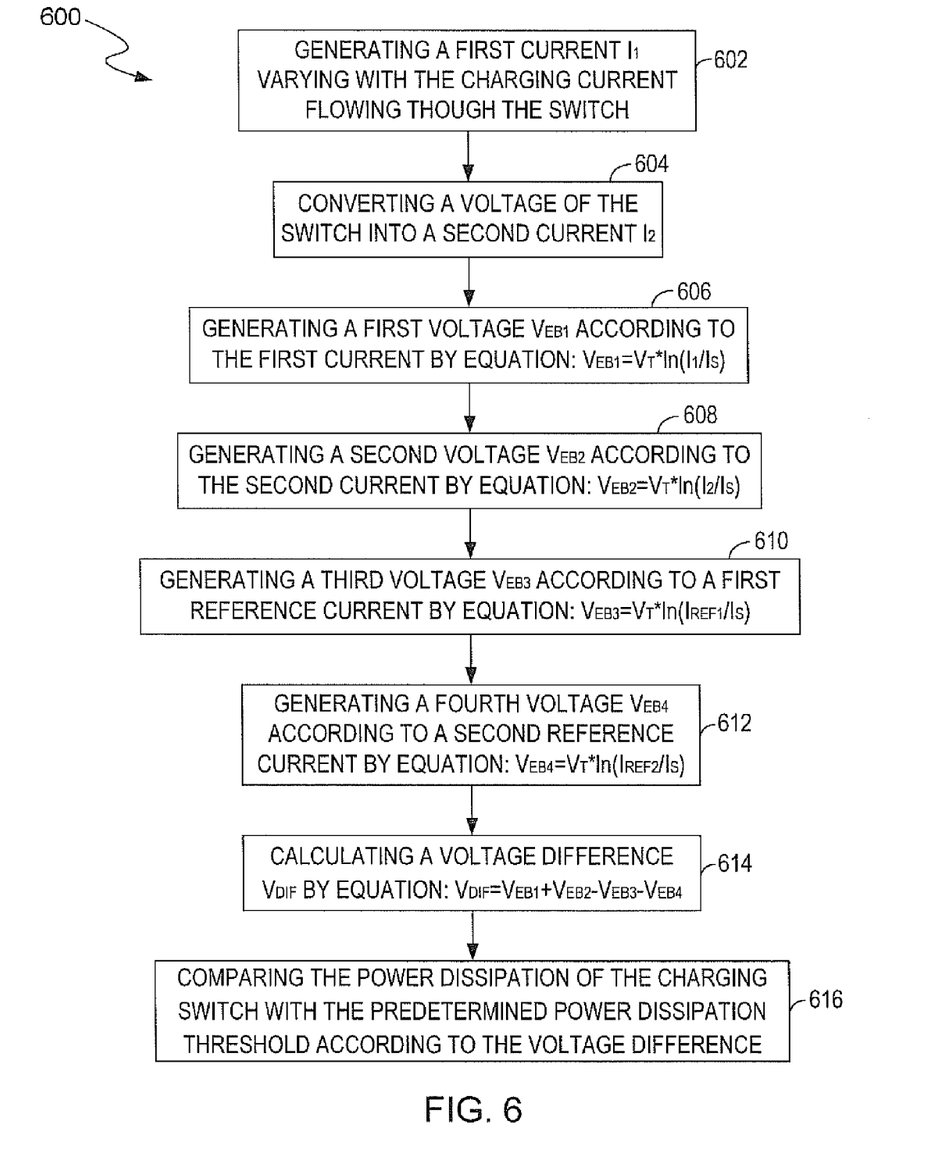
FIG. 6 illustrates a flowchart of operations performed by a battery charging system, in accordance with another embodiment of the present invention.

FIG. 6 illustrates a flowchart 600 of a method of comparing power dissipation of a charging switch with a predetermined power dissipation threshold in a battery charging system, e.g., the battery charging system 200 in FIG. 2, in accordance with one embodiment of the present invention. FIG. 6 is described in combination with FIG. 5 and FIG. 2.

In block 602, a first current $I_1$ that varies with the charging current flowing through the charging switch 252 is generated, as given by equation (25).

$$I_1 = I_{CHG}/K \qquad (25)$$

$I_{CHG}$ represents the charging current flowing through the charging switch 252. K represents a scaling parameter based on the relative sizes of the charging switch 252 and the current sensor 230. In one embodiment, the first current $I_1$ can be generated by the current sensor 230 (e.g., a PMOS transistor) with source and gate terminals respectively connected to the source and gate terminals of the charging switch 252. Since the size of the PMOS transistor 230 is K times smaller than the size of the charging switch 252, the first current $I_1$ can be K times smaller than the charging current $I_{CHG}$ if the short-channel modulation effect is ignored.

In block 604, a voltage across the charging switch 252 can be converted into a second current $I_2$ by equation (26).

$$I_2 = (V_{IN} - V_{BATT}) * Gm = (V_{IN} - V_{BATT})/R_{212} \qquad (26)$$

$G_m$ represents a conversion parameter. In one embodiment, the second current $I_2$ can be generated by an amplifier, e.g., the OTA 234, coupled between the source terminal and the drain terminal of the charging switch 252. A transconductance gain of the OTA 234 is set as the value of the conversion parameter Gm.

In block 606, a first voltage $V_{EB1}$ across an emitter and a base of a transistor, e.g., the PNP transistor 232, is generated according to the first current $I_1$ by equation (27), $$V_{EB1} = V_{T1} * \ln(I_1/I_{S1}) \qquad (27)$$

$V_{T1}$ represents a thermal voltage of the PNP transistor 232 at a given temperature. $I_{S1}$ represents a reverse saturation current of a base-emitter diode of the PNP transistor 232.

In block 608, a second voltage $V_{EB2}$ across an emitter and a base of a transistor, e.g., the PNP transistor 236, is generated according to the second current $I_2$ by equation (28).

$$V_{EB2} = V_{T2} * \ln(I_2/I_{S2}) \qquad (28)$$

$V_{T2}$ represents a thermal voltage of the PNP transistor 236 at a given temperature. $I_{S2}$ represents a reverse saturation current of a base-emitter diode of the PNP transistor 236. The $V_{T2}$ is equal to the $V_{T1}$. The $I_{S2}$ is equal to the $I_{S1}$.

In block 610, a third voltage $V_{EB3}$ across an emitter and a base of a transistor, e.g., the PNP transistor 218, is generated according to a first reference current $I_{REF1}$ by equation (29).

$$V_{BE3} = V_{T3} * \ln(I_{REF1}/I_{S3}) \qquad (29)$$

$V_{T3}$ represents a thermal voltage of the PNP transistor 218 at a given temperature. $I_{S3}$ represents a reverse saturation current of a base-emitter diode of the PNP transistor 218. The $V_{T3}$ is equal to the $V_{T1}$. The $I_{S3}$ is equal to the $I_{S1}$.

In block 612, a fourth voltage $V_{EB4}$ across an emitter and a base of a transistor, e.g., the PNP transistor 224, is generated according to a second reference current $I_{REF2}$ by equation (30).

$$V_{EB4} = V_{T4} * \ln(I_{REF2}/I_{S4}) \qquad (30)$$

$V_{T4}$ represents a thermal voltage of the PNP transistor 224 at a given temperature. $I_{S4}$ represents a reverse saturation current of a base-emitter diode of the PNP transistor 224. The $V_{T4}$ is equal to the $V_{T1}$. The $I_{S4}$ is equal to the $I_{S1}$.

Then in block 614, a voltage difference $V_{DIF}$ can be calculated by equation (31).

$$\begin{aligned} V_{DIF} &= V_{EB1} + V_{EB2} - V_{EB3} - V_{EB4} \qquad (31)\\ &= V_{T1} * \ln(I_1 * I_{S1}) + V_{T2} * \ln(I_2 * I_{S2}) - \\ &\quad V_{T3} * \ln(I_{REF1} * I_{S3}) - V_{T4} * \ln(I_{REF2} * I_{S4})\\ &= V_{T1} * (\ln(I_1 * I_2) - \ln(I_{REF1} * I_{REF2}))\\ &= V_{T1} * (\ln(I_{CHG} * (V_{IN} - V_{BATT})) - \ln(I_{REF1} * I_{REF2}))\\ &= V_{T1} * (\ln(P_{CHG}) - \ln(P_{SET})) \end{aligned}$$

$P_{CHG}$, which is equal to $I_{CHG} * (V_{IN} - V_{BATT})$, represents the power dissipation of the charging FET 252. $P_{SET}$ that is equal to $I_{REF1} * I_{REF2}$ represents the predetermined power dissipation threshold.

In block 616, the power dissipation $P_{CHG}$ of the charging switch 252 can be compared with the predetermined power dissipation threshold $P_{SET}$ according to the voltage difference $V_{DIF}$. If the voltage difference $V_{DIF}$ is a positive value, the power dissipation $P_{CHG}$ of the charging switch 252 is greater than the predetermined power dissipation threshold $P_{SET}$. If the voltage difference $V_{DIF}$ is a negative value, the power dissipation $P_{CHG}$ of the charging switch 252 is smaller than the predetermined power dissipation threshold $P_{SET}$.

Accordingly, battery charging systems, e.g., the battery charging systems 200 and 300 in FIG. 2 and FIG. 3, are disclosed herein. In one embodiment, the battery charging system includes a charging switch 252 to control a charging current flowing through the charging switch 252, and a first error amplifier 240 coupled to the charging switch 252. The first error amplifier 240 is used for adjusting the charging current to keep the power dissipation of the charging switch 252 relatively constant if a voltage of the battery is lower than a predetermined voltage threshold. The battery charging system can also include a second error amplifier 244 coupled to the charging switch 252. The second error amplifier 244 is used for adjusting the charging current to keep the voltage of the battery relatively constant if the voltage of the battery is equal to or greater than the predetermined voltage threshold. Furthermore, the battery charging systems can be used for charging multiple batteries.

If the voltage of the battery is lower than a predetermined voltage threshold, the battery cell 258 can be charged with constant power dissipation control on the charging switch 252. The first error amplifier 240 can compare the power dissipation of the charging switch 252 with a predetermined power dissipation threshold and generate a driving current to the charging switch 252 according to the power dissipation comparison result. If the power dissipation $P_{CHG}$ of the charging switch 252 is greater than the predetermined power dissipation threshold, the charging current $I_{CHG}$ flowing through the charging switch 252 can be decreased by the driving current. If the power dissipation $P_{CHG}$ of the charging switch 252 is smaller than the predetermined power dissipation threshold, the charging current $I_{CHG}$ flowing through the charging switch 252 can be increased by the driving current.

If the battery cell voltage is equal to or greater than the predetermined voltage threshold, the battery cell 258 can be charged under constant voltage control. The second error amplifier 244 can compare the voltage of battery with the predetermined voltage threshold and generate a driving current to the charging switch 252 according to the voltage comparison result. If the battery cell voltage $V_{BATT}$ is greater than the predetermined voltage threshold $V_{PRE}$, the charging current $I_{CHG}$ can be decreased by the driving current.

Advantageously, there will not be a thermal issue in the battery charging system 200 or 300 during a whole charge period even if the voltage difference between the voltage of the power source and the battery cell voltage $V_{BATT}$ is large. Moreover, the battery charging system can be used for charging an over-drained battery cell. When the voltage of the battery is very low, the charging current can be small to precharge the battery. In addition, when the voltage of the battery rises, the charging current can also increase until the power dissipation of the charging switch reaches the predetermined power dissipation threshold. Thus the overall charging speed can be fast.

The embodiments that have been described herein, however, are but some of the several that utilize this invention and are set forth here by way of illustration but not of limitation. It is obvious that many other embodiments, which will be readily apparent to those skilled in the art, may be made without departing materially from the spirit and scope of the invention as defined in the appended claims. Furthermore, although elements of the invention may be described or claimed in the singular, the plural is contemplated unless limitation to the singular is explicitly stated.

What is claimed is:

1. A circuit comprising:
   a switch operable for conducting a current flowing through a path that comprises said switch;
   a first amplifier coupled to said switch and operable for adjusting said current according to an amount of power dissipation associated with said path by comparing a sense voltage indicative of said amount of power dissipation with a predetermined value; and
   circuitry coupled to said first amplifier and operable for generating said sense voltage based on a first current indicative of said current flowing through said path and based on a second current indicative of a voltage across said path, wherein said circuitry comprises:
     a first transistor, wherein said first current flows through said first transistor; and
     a second transistor, wherein said second current flows through said second transistor, wherein a base-emitter diode of said first transistor is coupled to a base-emitter diode of said second transistor, and wherein said sense voltage is determined by the sum of a base-emitter voltage of said first transistor and a base-emitter voltage of said second transistor.

2. The circuit of claim 1, wherein said first amplifier performs a comparison of said sense voltage and said predetermined value and generates a driving current to said switch according to a result of said comparison.

3. The circuit of claim 1, further comprising a diode coupled between said first amplifier and said switch and operable for preventing a reverse current from said switch to said first amplifier.

4. The circuit of claim 1, further comprising a current source coupled to said switch and operable for providing a driving current to said switch to conduct said current through said path.

5. The circuit of claim 1, further comprising a third transistor coupled to said switch and operable for controlling said first current, wherein a driving voltage of said third transistor corresponds to a driving voltage of said switch.

6. The circuit of claim 1, further comprising a second amplifier coupled to said switch and operable for converting said voltage across said path to said second current.

7. The circuit of claim 1,
   wherein a base terminal of said second transistor is connected to an emitter terminal of said first transistor, and wherein an emitter voltage of said second transistor is input into said first amplifier.

8. The circuit of claim 1, wherein said base-emitter voltage of said first transistor is determined by said current flowing through said path, and said base-emitter voltage of said second transistor is determined by said voltage across said path, and wherein said sum is determined by said amount of power dissipation associated with said path.

9. A method for controlling a switch comprising:
   conducting a current flowing through a path that comprises said switch;
   adjusting, using an amplifier, said current flowing through said path according to an amount of power dissipation associated with said path by comparing a sense voltage indicative of said amount of power dissipation with a predetermined value; and
   generating said sense voltage based on a first current indicative of said current flowing through said path and based on a second current indicative of a voltage across said path, wherein said generating comprises:
     passing said first current through a first transistor; and
     passing said second current through a second transistor, wherein a base-emitter diode of said first transistor is coupled to a base-emitter diode of said second transistor, and wherein said sense voltage is determined by the sum of a base-emitter voltage of said first transistor and a base-emitter voltage of said second transistor.

10. The method of claim 9, further comprising:
    generating a driving current to said switch according to a result of said comparing.

11. The method of claim 9, further comprising preventing a reverse current from said switch to said amplifier.

12. The method of claim 9, further comprising controlling said first current using a third transistor coupled to said switch, wherein a driving voltage of said third transistor corresponds to a driving voltage of said switch.

13. The method of claim 9, further comprising converting said voltage across said path into said second current.

14. The method of claim 9, wherein a base terminal of said second transistor is connected to an emitter terminal of said first transistor.

15. The method of claim 9, further comprising:
    controlling said base-emitter voltage of said first transistor using said current flowing through said path;
    controlling said base-emitter voltage of said second transistor using said voltage across said path; and
    controlling said sum based on said amount of power dissipation associated with said path.

16. A battery charging system comprising:
    a charging switch for conducting a charging current flowing through a charging path to a battery;
    a first amplifier coupled to said charging switch and operable for adjusting said charging current according to an amount of power dissipation associated with said charging path if a voltage of said battery is lower than a predetermined voltage threshold, and operable for adjusting said charging current by comparing a sense voltage indicative of said amount of power dissipation with a predetermined value, wherein said sense voltage is generated based on a first current indicative of said charging current and based on a second current indicative of a voltage across said charging path, wherein said first current flows through a first transistor and said second current flows through a second transistor, wherein a base-emitter diode of said first transistor is coupled to a base-emitter diode of said second transistor, and wherein said sense voltage is determined by the sum of a base-emitter voltage of said first transistor and a base-emitter voltage of said second transistor; and a second amplifier coupled to said charging switch and operable for adjusting said charging current according to said voltage of said battery if said voltage of said battery reaches said predetermined voltage threshold.

17. The battery charging system of claim 16, wherein said first amplifier performs a comparison of said sense voltage and said predetermined value and generates a driving current to said charging switch according to a result of said comparison.

18. The battery charging system of claim 16, wherein said second amplifier performs a comparison of said voltage of said battery and said predetermined voltage threshold and generates a driving current to said charging switch according to a result of said comparison.

19. The battery charging system of claim 16, further comprising a diode coupled between said first amplifier and said charging switch and operable for preventing a reverse current from said charging switch to said first amplifier.

20. The battery charging system of claim 16, further comprising a diode coupled between said second amplifier and said charging switch and operable for preventing a reverse current from said charging switch to said second amplifier.

21. The battery charging system of claim 16, further comprising a third transistor coupled to said charging switch and operable for controlling said first current, wherein a driving voltage of said third transistor corresponds to a driving voltage of said charging switch.

22. The battery charging system of claim 16, further comprising a third amplifier coupled to said charging switch and operable for converting said voltage across said charging path to said second current.

23. The battery charging system of claim 16,
wherein a base terminal of said second transistor is connected to an emitter terminal of said first transistor, and wherein an emitter voltage of said second transistor is input into said first amplifier.

24. The battery charging system of claim 16, wherein said base-emitter voltage of said first transistor is determined by said current flowing through said charging path, and said base-emitter voltage of said second transistor is determined by said voltage across said charging path, and wherein said sum is determined by said amount of power dissipation associated with said charging path.

\* \* \* \* \*